United States Patent [19]

Gabelli et al.

[11] Patent Number: 4,703,662
[45] Date of Patent: Nov. 3, 1987

[54] MEANS FOR MEASURING A RADIAL FORCE

[75] Inventors: Antonio Gabelli, Ijsselstein; Jacobus Zwarts, Nieuwegein, both of Netherlands

[73] Assignee: SKF Industrial Trading & Development Company, B.V., Nieuwegein, Netherlands

[21] Appl. No.: 797,700

[22] Filed: Nov. 13, 1985

[30] Foreign Application Priority Data

Nov. 23, 1984 [NL] Netherlands .......................... 8403570

[51] Int. Cl.⁴ ....................... G01L 5/00; G01M 13/00; G01N 3/08
[52] U.S. Cl. ..................................... 73/862.54; 73/832
[58] Field of Search ................. 73/862.53, 862.54, 832

[56] References Cited

U.S. PATENT DOCUMENTS

| | | | |
|---|---|---|---|
| 2,866,059 | 12/1958 | Laimins | 73/862.65 X |
| 3,447,361 | 6/1969 | Schmitt | 73/832 |
| 3,488,682 | 1/1970 | Walters et al. | 73/832 X |

FOREIGN PATENT DOCUMENTS

| | | | |
|---|---|---|---|
| 2747262 | 4/1979 | Fed. Rep. of Germany | 73/862.54 |
| 2748945 | 5/1979 | Fed. Rep. of Germany | 73/862.54 |

Primary Examiner—Charles A. Ruehl
Attorney, Agent, or Firm—Eugene E. Renz, Jr.

[57] ABSTRACT

An apparatus for measuring a radial force proportionally distributed over the circumference of a member having a circular cross section including a measuring means having a fixed part (2) and a movable part (3). The movable part (3) consists of a circular segment having an enclosed angle which lies between 90° and 150°, the segment being radially movable in relation to the fixed part. The measuring means with movable and fixed parts are coupled through a load meter (6) rigidly connected at one end with the measuring means fixed part, and at the other end with the measuring means movable part. The load meter further comprises a bending bar (9) and means restraining movement of one end with respect to the other end except in one plane of the bar. The bending bar has a plurality of stretch strips.

1 Claim, 6 Drawing Figures

MEANS FOR MEASURING A RADIAL FORCE

FIELD OF THE INVENTION

The invention relates to a means for measuring a radial force proportionally distributed over the circumference of a member having a circular cross section, in particular for measuring the pressing force of a sealing ring on a shaft, wherein a measuring member has a fixed part and a part movable radially in relation to the latter, which parts are coupled by means of a load meter.

BACKGROUND OF THE INVENTION

Such a means for measuring the pressing force of a sealing ring is already known. In it a displacement of the movable part of the measuring member, consisting of a half cylinder, is transmitted to a load meter via a transmission mechanism. The transmission mechanism consists of a hinged angular element that converts the radial displacement of the movable part into an axial displacement which is measured by the load meter and reduced to a force. This angular element is only in loose contact with the movable part of the measuring member and with the load meter.

A drawback of this known means is that the transmission mechanism introduces errors into the measurements as a result of clearances and hysteresis in the transmission. This likewise influences the reproduceability of the measurements.

SUMMARY OF THE INVENTION

The object of the present invention is to procure a means of the sort mentioned at the beginning in which the drawbacks described above are eliminated in a simple and effective way.

To this end, the means according to the invention is characterized in that one end of the load meter is rigidly connected with the fixed part, while the movable part is attached directly to the other end.

In this measuring means all moving transmissions are omitted and the load meter is connected directly with both parts of the measuring member. Clearances and hysteresis which may occur in a transmission mechanism and produce errors are consequently completed eliminated. By this means it is alternatively possible to measure the pressing force in sealing rings rotating very slowly (for example, one revolution per minute). This has the advantage that the static friction appearing in a stationary sealing ring and influencing the measurement is then no longer present.

In a preferred embodiment the load meter consists of a bending bar provided with pairs of stretch strips, the ends of which beam do not rotate in relation to one another under unlike loads.

This load meter has the advantage that bending moments, lateral forces and torsion do not influence the measurement of the load component to be measured, while such load meter in addition contains no moving parts.

The said load meter further has the advantage that only very small displacements of the movable part of the measuring member are required for measuring a force. This displacement, therefore, has a negligible influence on the force exerted by the sealing ring.

In addition, in this embodiment it is possible to measure very small forces, and hence sealing rings having very long and thin lips may alternatively be accurately tested.

A favorable embodiment of the means according to the invention is characterized in that auxiliary elements forming an assembly of auxiliary elements are capable of attachment to the fixed and to the movable parts of the measuring member, each assembly of auxiliary elements having a circular cross section.

Sealing rings having different diameters may be tested in a very simple way by this means.

In addition, it is proposed according to the invention that the movable part of the measuring member comprise a circular segment with an enclosed angle lying between 90° and 150° and amounting to preferably 120°.

The advantage with respect to a movable part of the measuring member consisting of a half cylinder is a reduced disturbing influence on measurement of the pressing force in sealing rings rotating very slowly. Namely, a rotating sealing ring causes a dynamic frictional force in tangential direction. In a perfectly symmetrical design of the measuring member the resulting force in the direction of the load meter would be zero. In a small deviation from the ideal situation, however, the greatest disturbing forces in the movable part consisting of a half cylinder would appear at the ends of the center line defining the said movable part. By reducing the enclosed angle of the segment forming the movable part, the regions where the greatest component of error could occur fall outside the region of measurement.

The enclosed angle may not be selected too small, however, because local disturbing forces would then exert too great an influence on the total force, while the displacement of the movable part would likewise be capable of influencing the pressing force acting upon it.

BRIEF DESCRIPTION OF THE DRAWINGS

The invention will be explained below with the aid of the drawings, which represents an embodiment of the means according to the invention.

DESCRIPTION OF THE PREFERRED EMBODIMENTS

Figure 1B:
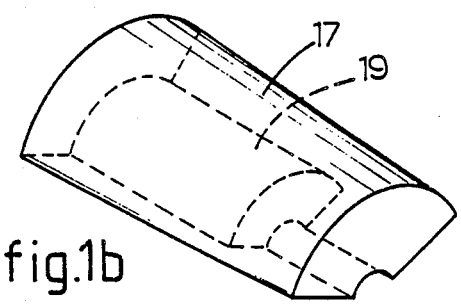
FIG. 1 is a perspective view, represented schematically, of a cut-away means according to the invention, FIG. 1a and FIG. 1b showing auxiliary elements.
Figure 1:
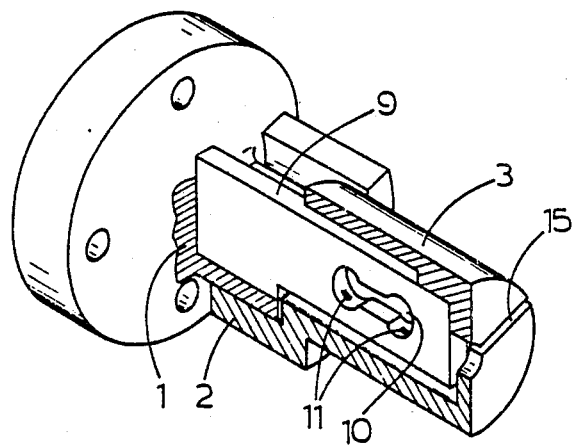
Figure 1A:
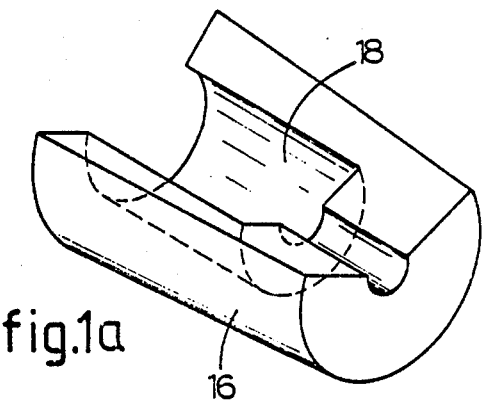
Figure 3:
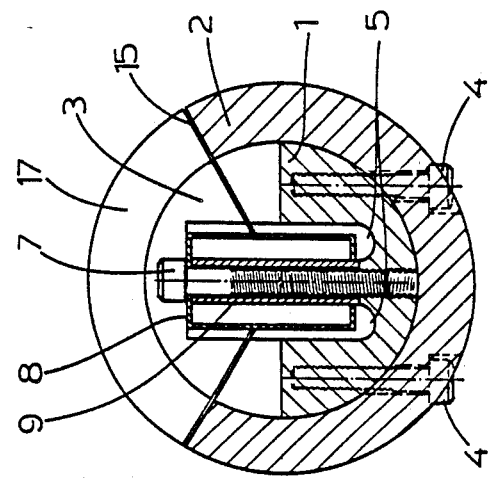
FIG. 3 is a cross section along line III—III in FIG. 2.
Figure 2:
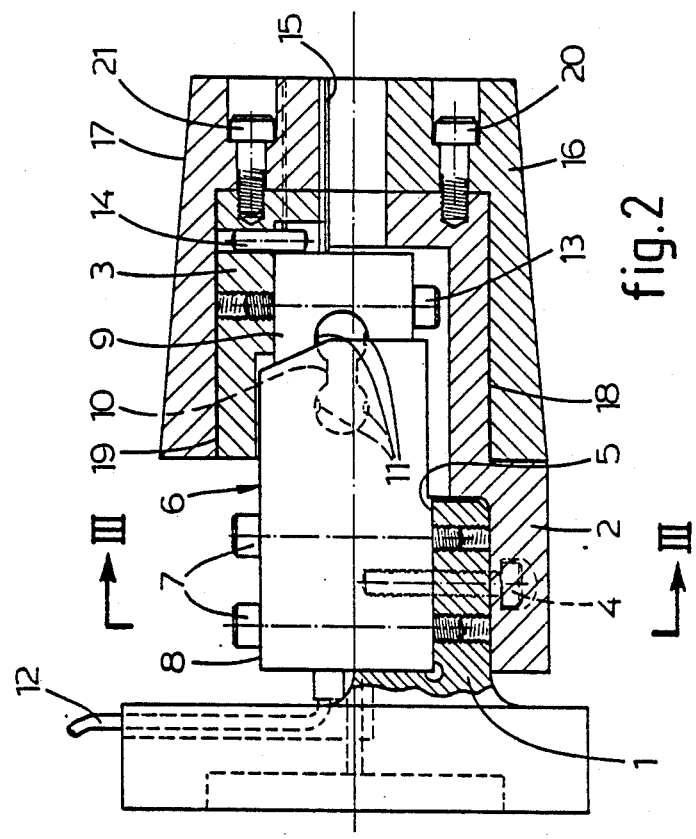
FIG. 2 is a side view of the means of FIG. 1, with assembled auxiliary elements.

In the drawing is represented an example of a means according to the invention, which is supported by a support 1. The measuring member of the means comprises a fixed part 2 and a part 3 movable radially in relation to the latter.

The fixed part 2 consists of a hollow shaft which is attached by bolts 4 to the support 1. From the fixed part 2, which is arranged horizontally during the measurement, a segment of 120° is removed at the top.

In a groove 5 of the support 1 a load meter 6 is attached by bolts 7. This load meter 6 contains a bending bar 9, provided with a cage 8 of synthetic material, which has a specially shaped recess 10 that keeps the ends of the bending bar 9 from rotating in relation to one another when the bending bar 9 is loaded in vertical direction. Namely, under vertical load the bending bar 9 would exhibit double reverse symmetrical bending, owing to which the free end does not rotate in relation to the solidly fixed end.

In the two circular parts of the recess 10 are symmetrically fitted pairs of coupled stretch strips 11, by which the vertical load on the bending bar 9 may be measured and on which moments acting on the bending bar 9 have no influence. Wiring 12 provides for the electrical connection of the strips 11.

The movable part 3 of the measuring member, consisting of an axial segment, is attached to the free end of the bending bar 9 by a bolt 13. A fitted pin 14 serves for accurate positioning of the movable part 3 in relation to the bending bar 9.

The axial segments of the fixed part 2 and the movable part 3 are reground after their assembly, in order to obtain a very accurate circular shape of the two parts together. Between the fixed part 2 and the movable part 3 is made a slot 15, so that the movable part 3 is displaceable radially inward.

On the fixed part 2 and the movable part 3 are mounted auxiliary elements 16 and 17, a cylindrical cavity 18 and 19 fitting very accurately on the outside of the fixed part 2 and the movable part 3. In its assembly and/or disassembly the auxiliary element 16 must be slipped respectively on or off the fixed part 2, the cross section of the cavity 18 there enclosing an angle of 240°. A plurality of bolts 20 and 21, distributed over a pitch circle, clamp and auxiliary elements 16 and 17 on the fixed part 2 and the movable part 3, respectively.

The assemblies 16, 17 of auxiliary elements always have a circular cross section of any desired size, but their shape in longitudinal direction may be freely selected. Consequently, it is possible to test sealing rings of every type and every size simply by replacing these assemblies 16, 17.

In addition, with a slightly conical shape of the assembly 16, 17 of the auxiliary elements, as is the case in the example represented, the relation between the pressing force and the axial diameter of a single sealing ring may be determined by slipping the latter over the conical assembly 16, 17 of auxiliary elements.

Figure 4:
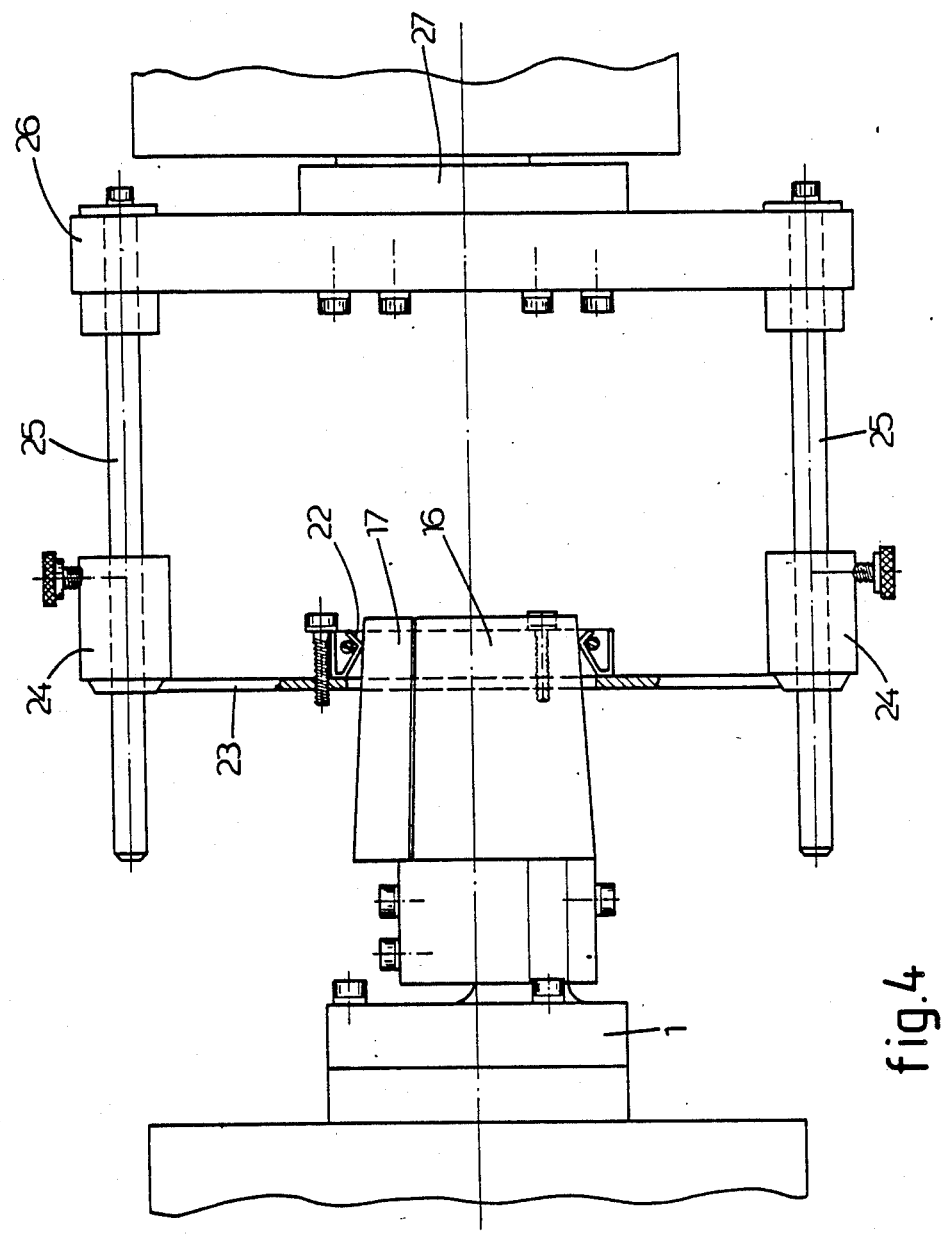
FIG. 4 is a side view of the device of FIG. 1 placed in a partially represented measuring arrangement.

FIG. 4 shows the means placed in a measuring arrangement, a sealing ring 22 being slipped onto the assembly 16, 17 of auxiliary elements. The sealing ring 22 is attached to a plate 23 designed with a hole, which plate is capable of being displaced by means of guide bushing 24 in longitudinal direction along guides 25. The guides 25 are attached by their end to a bracket 26, which in turn is connected with a rotary spindle 27. The axis of rotation of the spindle lies in line with the cardioid line of the sealing ring 22, so that the latter is capable of rotation about the assembly 26, 17 of auxiliary members.

The support 1 of the measuring means is supported by an opposing part of the arrangement, not further illustrated.

The invention is not limited to the example illustrated in the drawing, which may be varied in different ways within the scope of the invention.

What is claimed is:

1. An apparatus for measuring a radial force proportionally distributed over the circumference of a member having a circular cross section, comprising:
   (a) a measuring means;
   (b) said measuring means further comprising a fixed part (2) and a movable part (3) comprising a circular segment having an enclosed angle which lies between 90° and 150°, with said segment being radially movable in relation to said fixed part;
   (c) said measuring means movable and fixed parts being coupled through a load meter (6) rigidly connected at one end with said measuring means fixed part, and at the other end with said measuring means movable part;
   (d) said load meter further comprising a bending bar (9);
   (e) means restraining movement of one end of said bar with respect to the other end except in one plane of the bar; and
   (f) said bending bar being provided with a plurality of stretch strips.

* * * * *